United States Patent
Ichinose et al.

(10) Patent No.: US 8,299,642 B2
(45) Date of Patent: Oct. 30, 2012

(54) WIND POWER GENERATION SYSTEM

(75) Inventors: Masaya Ichinose, Hitachiota (JP);
Motoo Futami, Hitachiota (JP);
Hiromitsu Sakai, Tokai (JP); Kazuhiro Imaie, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 319 days.

(21) Appl. No.: 12/702,922

(22) Filed: Feb. 9, 2010

(65) Prior Publication Data
US 2010/0201330 A1   Aug. 12, 2010

(30) Foreign Application Priority Data
Feb. 10, 2009 (JP) .................. 2009-027976

(51) Int. Cl.
*H02H 7/06* (2006.01)
(52) U.S. Cl. .......................... 290/44; 322/59
(58) Field of Classification Search .................. None
See application file for complete search history.

(56) References Cited

U.S. PATENT DOCUMENTS

| | | | |
|---|---|---|---|
| 6,921,985 B2 | 7/2005 | Janssen et al. | |
| 7,321,221 B2 | 1/2008 | Bucker et al. | |
| 7,787,266 B2 * | 8/2010 | Janssen et al. | 363/37 |
| 2005/0116476 A1 | 6/2005 | Feddeersen | |
| 2008/0304188 A1 | 12/2008 | Ichinose et al. | |

FOREIGN PATENT DOCUMENTS

| | | |
|---|---|---|
| CN | 1625831 | 6/2005 |
| CN | 101320953 | 12/2008 |

* cited by examiner

*Primary Examiner* — Michael Zarroli
(74) *Attorney, Agent, or Firm* — Antonelli, Terry, Stout & Kraus, LLP.

(57) ABSTRACT

A wind power generation system includes an excessive current consumption device, an AC input of which is connected between a generator rotor and an excitation converter on a system failure to detect a DC voltage ascent of the excitation converter and operate a shunt circuit on the system failure.

14 Claims, 13 Drawing Sheets

WIND POWER GENERATION SYSTEM

BACKGROUND OF THE INVENTION

The present invention relates to a wind power generation system which realizes to absorb an excessive current generated on a rotor of an AC excitation generator to protect a converter connected to the rotor when occurring a voltage descent caused by a power failure in an electric power system and restart the operation of converter connected to the rotor after absorbing the excessive current without electrically decoupling the wind power generation system from the power system.

The AC excitation generator for use in generating equipment excites a rotor winding in the AC by a slip frequency (a difference between system frequency and rotation frequency) in an electric power converter. Therefore, a voltage generated on a stator side can be made to the same frequency equivalent to the system frequency by the excitation of rotor. That is, an excitation frequency (slip frequency) of the rotor is made variable, in consequence, there is an advantage that the rotation number of a windmill can be made variable and the capacity of power converter can be made small compared with the capacity of generator.

However, the AC excitation generator is intended to supply a current to a fault point in its operation when the voltage descent caused by a grounding fault occurs in the power system. At this time, the excessive current is induced on the rotor winding to thereby flow the excessive current into the excitation converter connected to the rotor side. Therefore, such a method of installing equipment, which shunts a rotor circuit referred to as a Crowbar, has been used.

A specification has been established in Europe in such that the operation must be continued without electrically decoupling the wind power generation system from the power system, at a time of the power system failure. That is, the operation has been demanded in such that an adverse effect on the power system is made small by restarting the generating operation after the failure without electrically decoupling the wind power generation system from the power system at the time of voltage descent in a short time period.

In the past, U.S. Pat. No. 6,921,985 has disclosed a system in which a shunt circuit is made operated when detecting an excessive current of a generator-sided inverter. Further, U.S. Pat. No. 7,321,221 has disclosed a system in which the shunt circuit is made operated when detecting the system voltage descent.

SUMMARY OF THE INVENTION

The invention aims to provide a wind power generation system which protects an excitation power converter in an AC excitation generator from the excessive current caused by the system failure and system disturbance to thereby continue the operation without electrically decoupling the generator from the power system. Particularly, the wind power generation system prevents a converter DC excessive voltage to be able to restart the generating operation from immediately after recovering the system failure, by avoiding a case where the converter cannot be operated by causing a converter DC voltage ascent before the rotor attains to the excessive current level at a time of a low generated power amount.

In the wind power generation system of the invention, an AC input of an excessive current consumption device is connected between a generator rotor and an excitation converter at a time of system failure to detect the DC voltage ascent of the excitation converter and operate a shunt circuit at the time of system failure.

In order to achieve the above-mentioned object, the wind power generation system for supplying a generated power to a power system from an AC excitation generator, provides that a stator of the AC excitation generator is connected with the power system, an AC excitation converter is connected with a rotor of the AC excitation generator, the rotor of the AC excitation generator is connected with a turbine to rotate the rotor of the AC excitation generator by a motive energy of the turbine, and a shunt circuit unit, shuntable by a switching unit, is provided between the AC excitation converter and the rotor of the AC excitation generator, and a system-sided converter is connected between the stator of the AC excitation generator and the power system, a DC portion of the system-sided converter is connected with a DC portion of the AC excitation converter, and a controller is provided for controlling an excitation converter and the system-sided converter backed up at when a system voltage is descended, wherein the controller provides a unit that detects a DC voltage and a DC voltage ascent detection unit, and a unit that detects the DC voltage ascent to operate the shunt circuit unit.

The controller includes a unit that detects a current between the generator and the AC excitation converter as an excessive current, and the shunt circuit unit is operated by a signal from either the unit that detects the excessive current or the DC voltage ascent detection unit.

The DC voltage ascent detection unit detects a larger voltage value than that in a normal operation.

The DC voltage ascent detection unit detects the DC voltage ascent by an excessive voltage detection level set between a voltage level at the normal operation and an excessive voltage level for stopping a protection for the converter.

The DC voltage ascent detection unit detects that a deviation between a DC voltage command value and a detected value is large.

The system includes a unit that stops a gate of the AC excitation converter when the excessive current occurs between the generator and the converter.

The shunt circuit unit includes a plurality of resistors, and a unit that operates substantially and simultaneously the resistors on a shunt and makes the resistors non-conductive in series on a release from the shunt.

The shunt circuit unit includes a plurality of resistors, a unit that operates substantially and simultaneously the resistors on a shunt and makes the resistors non-conductive in series on a release from the shunt, and a unit that makes a period, during which the resistors operate simultaneously, variable in response to an amplitude value of a system voltage.

Shunted resistors are turned to non-conduction by the shunt circuit unit to then start an operation of the AC excitation converter, after starting the operation, an active power and a reactive power of the stator of the AC excitation generator are controlled to substantially zero when a reverse-phase component is largely present in a voltage of the power system.

The shunt circuit unit applies an operation to the resistors such that a cycle from a simultaneous conduction of the resistors to a non-conduction of those in series is performed continuously by twice, and the wind power generation system is stopped when the cycle is turned to three times.

The system includes a unit that prevents a rapidly varied command value of a generated power controlled by the converter.

The system further includes a unit that detects a system voltage descent, and a unit that descends the DC voltage of the converter when descending the system voltage.

The system further includes a unit that changes an active component current to a discharge when ascending the DC voltage of the converter.

The system further includes a unit that detects the excessive current of the AC current output from the system-sided converter, a unit that temporarily stops the system-sided converter when the excessive current detection unit detects the excessive current, and a unit that restarts the converter.

According to the wind power generation system of the invention, the AC input of the short circuit (excessive current consumption device) is connected between the generator rotor and the excitation converter to detect the system voltage descent and the DC voltage ascent of the excitation converter and operate the excessive current consumption device. In consequence, the excitation electric power converter in the AC exciting generator is protected from the excessive current caused by the system disturbance to then realize an operation continuation.

The other objects, features and advantages of the invention will become apparent from the following description of the embodiments of the invention taken in conjunction with the accompanying drawings.

DESCRIPTION OF THE EMBODIMENTS

Hereinafter, an embodiment of the invention will be described with reference to the drawings.

Figure 1:
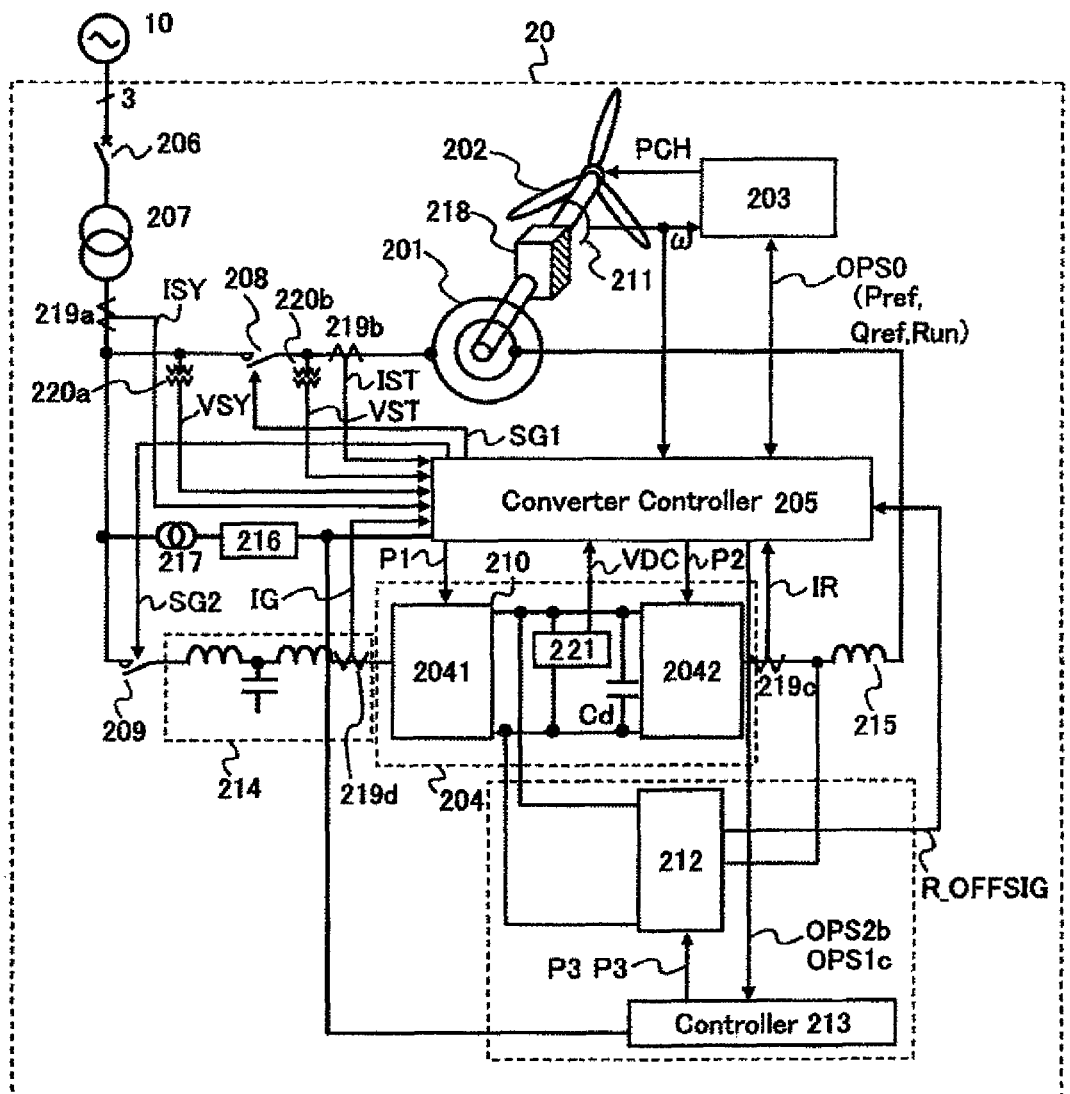
FIG. 1 is a diagram showing a circuit configuration of a wind power generation system.

An embodiment of the invention will be described with reference to FIG. 1 showing a system configuration diagram (one-line wiring diagram).

A wind power generation system 20 is connected to an electric power system 10 via a power transmission line. The wind power generation system 20 is configured mainly by a generator 201, blades 202, a windmill controller 203, a converter (excitation device) 204, a converter controller 205, an excessive current consumption device 212 and a controller 213 of the excessive current consumption device 212.

The blades 202 are coupled mechanically to a rotor of the generator 201 via a gear 218.

A rotor winding of the generator 201 is connected electrically to the converter 204, and a stator of the generator 201 is connected electrically to a power system via a breaker 206 and a transformer 207.

The windmill controller 203 calculates an operation command signal OPS0 containing a wind speed, an angle control of the blades 202, a generation of a generation power command value Pref, an output of a start/stop command value Run and a generation of a reactive power command Qref.

The operation command signal OPS0 containing the reactive power command value Qref, the generation power command value Pref and the start/stop command value Run, generated by the windmill controller 203, and a blade angle command value PCH, are transmitted respectively to the converter controller 205 and a blade angle changing device.

The converter controller 205 regulates a voltage output from the converter 204 so as to comply with the command values to control a power (generation power, reactive power) between the generator 201 and the power system.

The following description will be concerned with a converter (excitation device) 2042, a converter 2041, the excessive current consumption device 212 and the controller 213 of the excessive current consumption device 212. A three-phase output of the stator on the generator 201 is connected to the power system 10 via the breaker 208 capable of opening/closing by an external signal or a start signal SG1, the transformer 207 used for the power system linkage and the breaker 206. Further, a circuit of a breaker 208 for the transformer 207 used for the power system linkage is connected respectively to an AC filter circuit 214 and the converter 2041 via another breaker 209.

A DC circuit 210 of the converter 2041 is also connected to a DC circuit of the converter 2042, and an AC output of the converter 2042 is connected to the rotor winding of generator 201 via a reactor 215 used for a suppression of time variation of voltage dv/dt.

Further, an AC input terminal of the excessive current consumption device 212 is connected between the converter 2042 and the reactor 215, and DC output terminals of the excessive current consumption device 212 are connected respectively to the DC circuit 210 of the converters 2041 and 2042. DC terminals of the excessive current consumption device 212 and converter 204 may be connected via an impedance, and may also be connected by a low impedance.

The converter controller 205 is backed up by an uninterruptible power supply 216, therefore, the electric power is supplied to the converter controller 205 from the uninterruptible power supply 216 when the system voltage is descended. The controller 213 of the excessive current consumption device 212 is also backed up by the uninterruptible power supply 216, therefore, the power is supplied to the controller 213 from the uninterruptible power supply 216 when the system voltage is descended.

The breaker 206 opens itself to cut off the current excessively flown into it for protecting the wind power generation system 20 to completely stop it and electrically decouple the system 20 from the electric power system 10.

The generator-sided converter 2042 and the power system-sided converter 2041 are configured by using semiconductor switching devices (GTO, IGBT, MOS, SiC, etc.), and provide a function which converts AC to DC or other way around.

Further, the output terminals of the power system-sided converter 2041 are connected with an AC filter circuit 214 configured by a reactor and capacitor for attenuating harmonic current and voltage.

The blades 202 used for the wind power generation are coupled to a rotation portion of the generator 201 via the gear 218 to rotate with the force of wind. A position detector 211 such as an encoder is coupled to the rotation portion to detect a rotation position and output a rotation number signal ω. The detected rotation number signal ω is entered into the windmill controller 203 and converter controller 205.

The following description will be concerned with wirings and devices for controlling the generated power. Three-phase voltage and current on the secondary side of transformer 207 are detected respectively by a voltage sensor 220a and a current sensor 219a to convert its values into a voltage detected signal VSY and a current detected signal ISY in terms of the low voltage, and the signals VSY and ISY in terms of the low voltage then enter the converter controller 205.

A voltage value on the secondary side (between the breaker 208 and the stator of generator 201) of breaker 208 is detected by a voltage sensor 220b to convert its value into a signal VST in terms of the low voltage and then enter the converter controller 205.

A voltage across a capacitor Cd connected with the DC portion of the converters 2041, 2042 is converted into a DC voltage signal VDC in terms of the low voltage by a voltage sensor, and the DC voltage signal VDC enters the converter controller 205.

Further, an output current IR of the converter 2042 is detected by a current sensor 219c, and an output current IG of the converter 2041 is detected by a current sensor 219d. Both the detected output currents IR and IG are transmitted to the converter controller 205.

The windmill controller 203 provides a communication function to transmit the command value OPS0 including the start/stop command value Run, the generation power command value Pref, the reactive power command Qref, etc. to the converter controller 205 and detect a state quantity of the windmill and the system to communicate with externally.

The converter controller 205 controls the breakers 208, 209 by respectively using the start signal SG1 and a start signal SG2, and outputs pulse signals P1, P2 to drive and control respectively the converters 2041, 2042 configured by the semiconductor switching devices.

The power supply of converter controller 205 is connected to the uninterruptible power supply 216 so as to be operated even when the system voltage is descended. The uninterruptible power supply 216 receives the voltage regulated by a transformer 217. The electric power is supplied to the converter controller 205 from the system power supply when the input voltage of uninterruptible power supply 216 is normal, but supplied to the converter controller 205 from an energy accumulation unit (for example, battery) in the uninterruptible power supply 216 when the system voltage is abnormal.

The controller 213 of the excessive current consumption device 212 transmits an operation command P3 to the excessive current consumption device 212. A detailed operational description of the controller 213 is omitted here, but will be described later.

Figure 2:
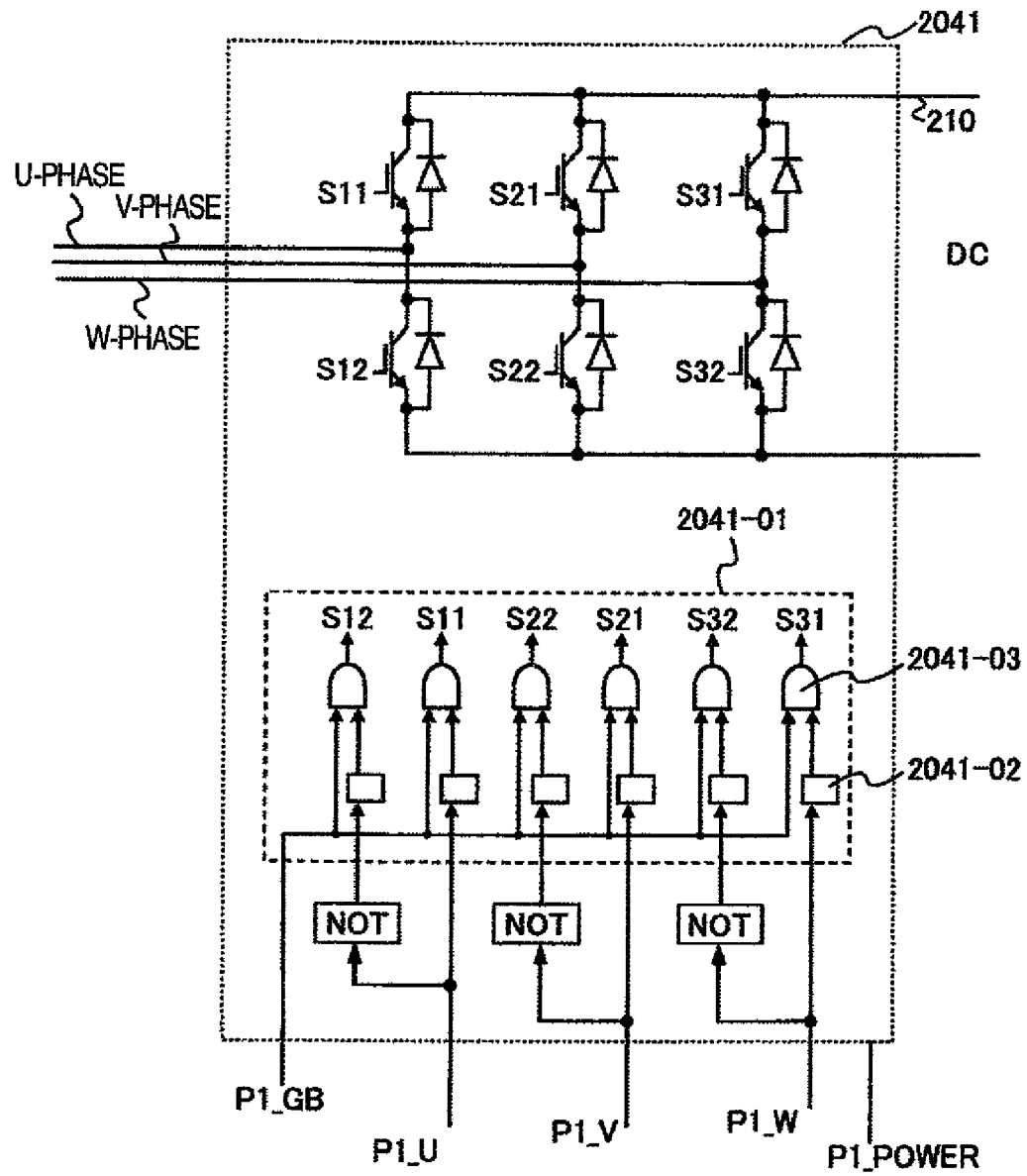
FIG. 2 is a diagram showing a configuration of a system-sided converter 2041.

FIG. 2 shows a configuration of the converter 2041. The converter 2041 is configured by the semiconductor devices etc. Here, the converter 2041 is of a three-phase converter configuration and configured by the semiconductor devices (in this embodiment, description will be concerned with a converter configured by IGBTs and diodes, as an example) S11, S12, S21, S22, S31 and S32. The devices S11, S12 configure upper and lower arms of a U-phase, the devices S21, S22 configure upper and lower arms of a V-phase, and the devices S31, S32 configure upper and lower arms of a W-phase.

These semiconductor device IGBTs (Insulated Gate Bipolar Transistor) are turned on and off to generate a three-phase AC voltage on the AC terminals, and the AC voltage is regulated to be able to control the output current IG.

A gate signal P1 (P1_GB, P1_U, P1_V, P1_W) for turning the semiconductor devices on and off is given from the converter controller 205. Here, a suffix U of the gate signal P1 indicates the signal P1_U of the U-phase, likewise, the signal P1_V of the V-phase, and the signal P1_W indicates a gate signal of the W-phase. Further, a signal P1_POWER is supplied from the converter controller 205 by a gate circuit power supply, which is insulated, for turning the devices of converter 2041 on and off. The gate block signal P1_GB is a signal to stop (semiconductor devices S11 to S32 are turned all off) the turn on and off operation of the semiconductors S11 to S32 by causing the gate signal, and similarly given from the converter controller 205.

The gate signal of the lower arm device S12 for the U-phase is given as an invert of the upper arm device S11 (that is, the device S12 is turned off when the device S11 is on). Similarly to the upper and lower arms for the V-phase and W-phase, the lower arms are given as the invert signals of the upper arms. For a purpose of generating the invert signal, an invert device NOT is used. A period referred to as a dead-time is added to the gate signals S11 to S32 by a shunt prevention circuit 2041-02 in a gate circuit 2041-01 for a shunt prevention (prevention for the on-state at the same time) of the upper and lower arms.

The gate block signal P1_GB enters an AND circuit 2041-03 together with the pulse signal P1 to then become the gate block signal P1_GB turned to "0" when the gate stops. Therefore, at this time, the semiconductor devices S11 to S32 become all off-state regardless of the state of the pulse signals P1_U, P1_V and P1_W.

Figure 3:
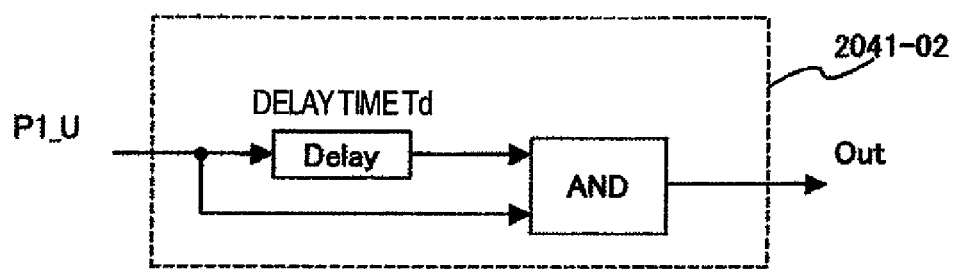
FIG. 3 is a diagram showing a dead-time adders 2041-02, 2042-02.

FIG. 3 shows a configuration of the shunt prevention circuit 2041-02. The entered pulse is added with a time delay of a shunt prevention period by a time delay adder Delay. A signal added with the time delay and the entered original signal are entered into an AND operation unit to implement an AND operation. In consequence, an output signal Out becomes a signal added with an on-delay of a time delay Td to the original signal. In this way, by adding the on-delay to the signal of the upper and lower arms, the lower arm switching devices are turned on at the time delay Td from the off-state when the upper switching devices are turned off. Therefore, the upper and lower switching devices are prevented from becoming transiently on-state at the same time, so that the shunt of DC can be prevented.

Figure 4:
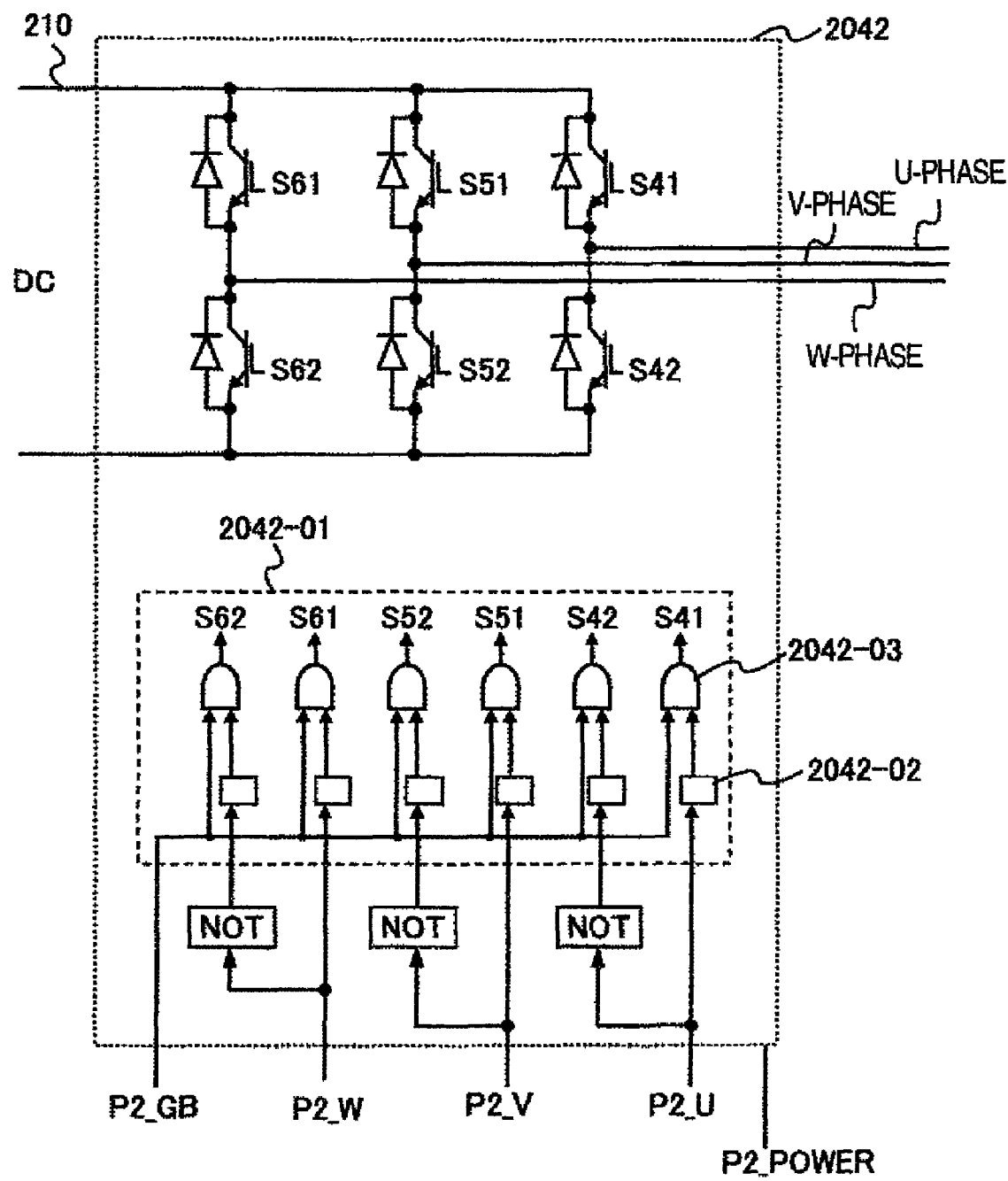
FIG. 4 is a diagram showing a configuration of a generator-sided converter 2042.

FIG. 4 shows a configuration of the converter 2042. The converter 2042 is configured by the semiconductor devices similar to the converter 2041. Here, the converter 2042 is of a three-phase converter configuration and configured by the semiconductor devices (IGBTs and diodes) S41, S42, S51, S52, S61 and S62. The devices S41, S42 configure the upper and lower arms of the U-phase, the devices 551, S52 configure the upper and lower arms of the V-phase, and the devices S61, S62 configure the upper and lower arms of the W-phase.

These semiconductor devices are turned on and off to generate the three-phase AC voltage on the AC terminals, and the AC voltage is regulated to be able to control the current IR output from the converter 2042.

A gate signal P2 for turning the semiconductor devices on and off is given from the converter controller 205. The gate signal P2 contains gate signals (three-phase amount) of the respective phases, a gate circuit operation power supply signal and a gate block signal, which are respectively represented by P2_U, P2_V, P2_W, P2_POWER and P2_GB, as signal name (a suffix U of the signal name indicates the signal P2_U of the U-phase, the signal P2_V of the V-phase, and the signal P2_W indicates the gate signal of the W-phase).

The gate signal of the lower arm device S42 for the U-phase is given as an invert of the upper arm device S41 (that is, the device S42 is turned off when the device S41 is on). Similarly to the upper and lower arms for the V-phase and W-phase, the lower arms are given as the invert signals of the upper arms. For a purpose of generating the invert signal, the invert device NOT is used. A period referred to as a dead-time is added to the gate signals S41 to S62 by the shunt prevention circuit 2041-02 in the gate circuit 2041-01 for a shunt prevention period of the upper and lower arms.

For a purpose of stopping the on and off operation of semiconductor device, the gate block signal P2_GB is used. The gate block signal P2_GB enters AND circuits 2042-03 each coupled to the pulse signal P2 (P2_U, P2_V and P2_W), and becomes P2_GB turned to "0" when the gate stops. Therefore, at this time, the semiconductor devices S41 to S62 become all off-state regardless of the state of pulse signal P2.

A function of the converter controller 205 will be described with reference to FIG. 5 to FIG. 8.

Figure 5:
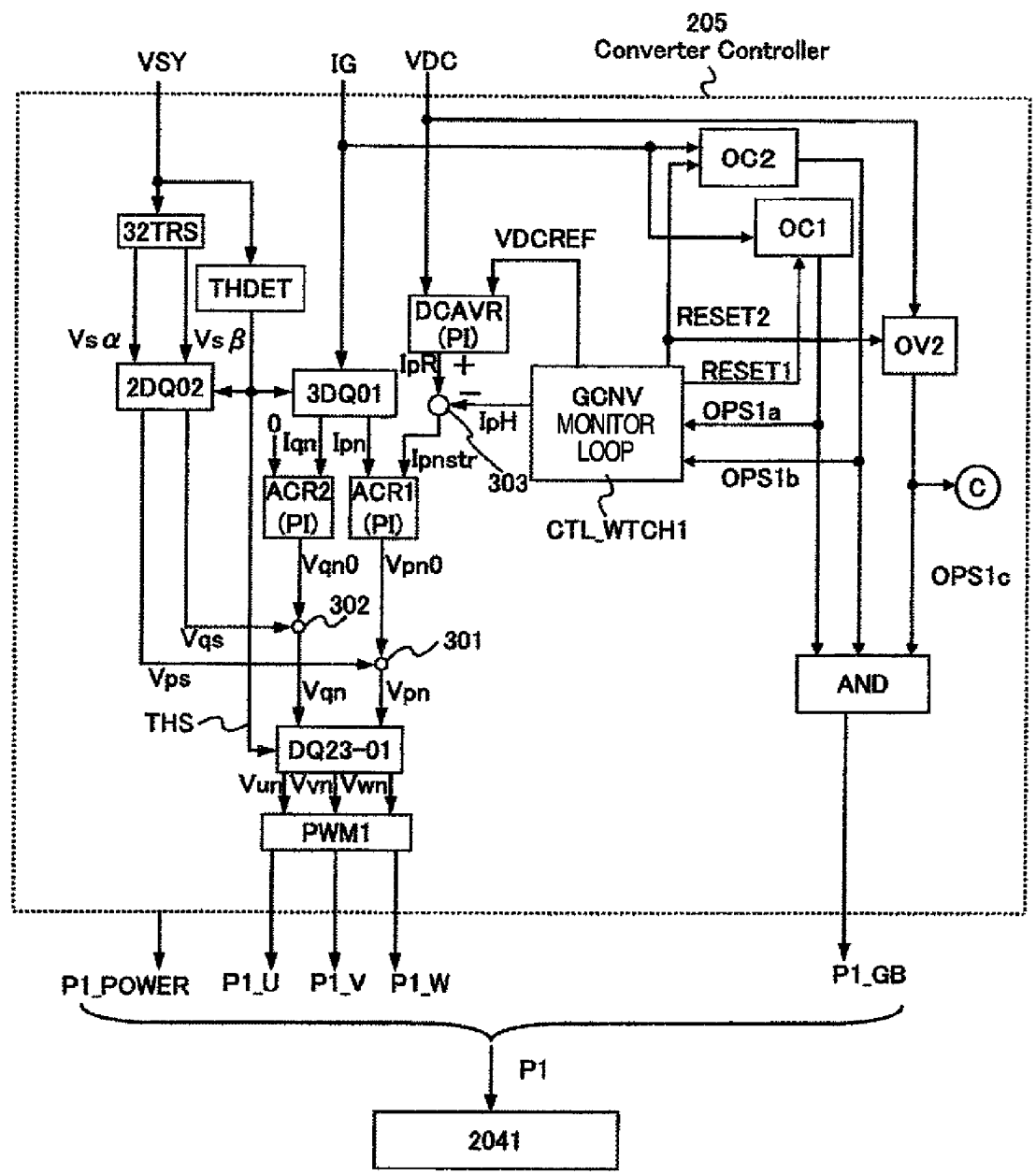
FIG. 5 is a diagram showing a control configuration of the system-sided converter 2041.

FIG. 5 shows a control configuration of the converter 2041. The converter 2041 has a function to control constantly the DC voltage VDC across the smoothing capacitor Cd. Therefore, a control unit of the converter 2041 detects a phase of the system voltage VSY (three-phase) to control the current IG (three-phase) by using the detected voltage phase, exchange an active power with the system, and then control the DC voltage.

The generator excitation converter 2042 uses the power of the DC component to consume an energy of the smoothing capacitor Cd. When the DC voltage VDC is descended, a DC voltage controller DCAVR regulates an active component current Ipn (active power component) to charge the smoothing capacitor Cd and maintain the DC voltage VDC constant. Conversely, when the converter 2042 charges the DC power to ascend the DC voltage VDC, the DC voltage controller DCAVR of the converter 2041 converts the DC power to AC power to regulate the active component current Ipn (active power component) to be discharged to the electric power system and maintain the DC voltage VDC constant.

Before the converter 2041 starts the operation, the DC voltage VDC is charged from an initial charging circuit (not shown) for the DC voltage. Thereafter, the start signal SG2 for activating the breaker 209 is output from the converter controller 205 to thereby connect the converter 2041 to the system.

The three-phase AC voltage detected signal VSY enters a phase detector THDET and a three-phase/two-phase converter 32TRS. The phase detector THDET outputs a phase signal THS (angle signal when the system U-phase voltage is a sine wave) complied with the system voltage to a three-phase/two-phase rotating coordinate converter 3DQ01, a two-phase dq converter 2DQ02 and a two-phase/three-phase rotating coordinate converter DQ23-01. A DC voltage command value VDCREF and the DC voltage VDC enter the DC voltage controller DCAVR (for example, configured by a proportional-integral controller PI). The DC voltage controller DCAVR regulates a p-axis current command value (active component current command value) IpR such that a deviation between the received DC voltage command value VDCREF and the DC voltage VDC becomes zero, and adds and subtracts a current command IpH by an adder-subtractor 303. A result Ipnstr is then output to a current regulator ACR1.

The three-phase current IG output from the system-sided converter 2041 enters excessive current detectors OC1, OC2, and the DC voltage VDC is detected by a voltage detection unit 221 and enters an excessive voltage detector OV2. The excessive current detectors OC1, OC2 and the excessive voltage detector OV2 are configured by a comparator and a holding circuit to change excessive voltage detected signals OPS1$a$, OPS1$b$ and OPS1$c$ from "1" to "0" and then hold them when detecting an excessive current or excessive voltage. Reset signals RESET1, RESET2 are received from a monitor loop process CTL_WTCH1 to release the output "0" of the excessive current detectors OC1, OC2 and the excessive voltage detector OV2 and then change their output to "1". The excessive current detector OC1 is set so as to operate at a lower current level than that of the excessive current detector OC2. Further, the excessive voltage detector OV2 is set so as to operate at a higher voltage than that of an after-mentioned excessive voltage detector OV1.

The monitor loop process CTL_WTCH1 outputs the DC voltage command value VDCREF and the active component current command value correction amount IpH.

Figure 15:
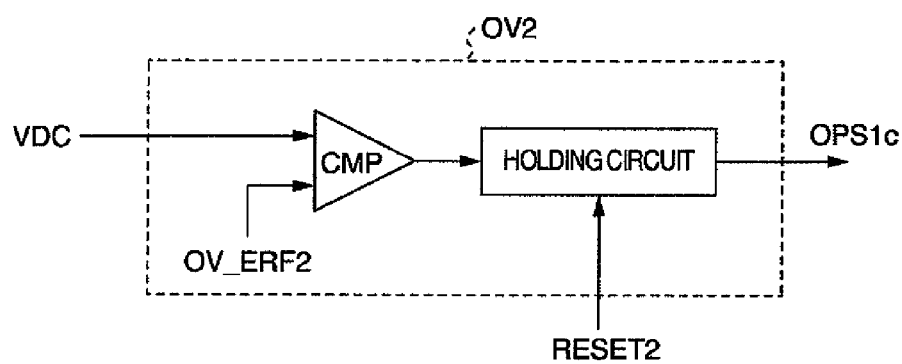
FIG. 15 indicates a constitution of a DC voltage ascent detection unit OV2.

FIG. 15 indicates a constitution of a DC voltage ascent detection unit OV2. A DC excessive voltage is monitored by the excessive voltage detector OV2 and outputs the excessive voltage detected signal OPS1$c$ to an AND operation unit AND, when the DC voltage VDC is higher than an excessive voltage level OV_REF2. The excessive voltage detector OV2 generates the excessive voltage detected signal OPS1$c$ so as to be turned to "0" when the excessive voltage is detected, otherwise, turned to "1", and also has a function to hold that value when the signal is turned to "0" by detecting the excessive voltage. The excessive voltage detected signal OPS1$c$ is also used for a control unit of the converter 2042 shown in FIG. 7.

The excessive current and excessive voltage detected signals OPS1$a$, OPS1$b$ and OPS1$c$ are transmitted to an OR operation unit and the monitor loop process CTL_WTCH1. The AND operation unit AND executes the AND operation of the excessive current detected signals OPS1$a$, OPS1$b$ and OPS1$c$ to transmit that result P1_GB or gate block signal to the converter 2041. That is, when the excessive current and excessive voltage detected signals OPS1$a$, OPS1$b$ and OPS1$c$ are turned to "0", the gate block signal P1_GB becomes "0" and the converter 2041 stops the switching operation.

The three-phase DQ coordinate converter 3DQ01 calculates the p-axis current detected value Ipn (active component current) and a q-axis current detected Iqn (reactive component current) from the received current IG by using a three-phase/two-phase conversion equation indicated by an expression (1) and a rotation coordinate conversion equation indicated by an expression (2) to then output the p-axis current detected value Ipn to the current regulator ACR1 and the q-axis current detected value Iqn to a current regulator ACR2.

Here, suffixes u, v and w represent respective phases of three-phase AC. For example, a U-phase current of the current IG is represented by IGU. Likewise, the voltage is also represented by such that the U-phase of the system voltage VSY is represented by VSYU. Here, a coefficient k1 is a coefficient converted into an arbitrary unit in a microcomputer.

$$\begin{pmatrix} In\alpha \\ In\beta \end{pmatrix} = k1 \begin{pmatrix} \cos(0) & \cos(2\pi/3) & \cos(4\pi/3) \\ \sin(0) & \sin(2\pi/3) & \sin(4\pi/3) \end{pmatrix} \begin{pmatrix} IGU \\ IGV \\ IGW \end{pmatrix} \quad (1)$$

$$\begin{pmatrix} Ipn \\ Ipn \end{pmatrix} = \begin{pmatrix} \sin(THS) & -\cos(THS) \\ \cos(THS) & \sin(THS) \end{pmatrix} \begin{pmatrix} In\alpha \\ In\beta \end{pmatrix} \quad (2)$$

The current regulator ACR1 regulates a p-axis voltage command value Vpn0 as an output such that a deviation between the p-axis current command value Ipnstr and the p-axis current detected value Ipn becomes zero to then output to an adder 301. Likewise, the current regulator ACR2 regulates a q-axis voltage command value Vqn0 as an output such that a deviation between a q-axis current command value, which is "0", and the q-axis current detected value Iqn becomes zero to then output to an adder 302. Here, the current regulators ACR1, ACR2 can be configured by a proportional-integral (PI) controller.

The three-phase/two-phase converter 32TRS calculates an α-component Vsα and a β-component Vsβ from the received voltage VSY by using a conversion equation indicated by an expression (3), and also calculates a p-axis voltage detected value (a component matched with the system voltage vector) Vps and a q-axis voltage detected value (a component perpendicular to the p-axis voltage detected value Vps) Vqs to then output respectively to the adders 301, 302. Here, a coefficient k2 is a coefficient converted to an arbitrary unit in the microcomputer.

$$\begin{pmatrix} Vs\alpha \\ Vs\beta \end{pmatrix} = k2 \begin{pmatrix} \cos(0) & \cos(2\pi/3) & \cos(4\pi/3) \\ \sin(0) & \sin(2\pi/3) & \sin(4\pi/3) \end{pmatrix} \begin{pmatrix} Vsu \\ Vsv \\ Vsw \end{pmatrix} \quad (3)$$

$$\begin{pmatrix} Vps \\ Vqs \end{pmatrix} = \begin{pmatrix} \sin(THS) & -\cos(THS) \\ \cos(THS) & \sin(THS) \end{pmatrix} \begin{pmatrix} Vs\alpha \\ Vs\beta \end{pmatrix} \quad (4)$$

The adder 301 adds the p-axis voltage command value Vpn0 and the p-axis voltage detected value Vps to output to the two-phase/three-phase coordinate converter DQ23-01. Likewise, the adder 302 adds the q-axis voltage command value Vqn0 and the q-axis voltage detected value Vqs to then output to the two-phase/three-phase coordinate converter DQ23-01.

The two-phase/three-phase coordinate converter DQ23-01 receives the phase signal THS, the p-axis voltage detected value Vpn and the q-axis voltage command value Vqn of the adders 301, 302 to calculate voltage command values Vun, Vvn and Vwn as outputs by using conversion equations indicated by expressions (5) and (6) to then output to a pulse operation unit PWM1. Here, a coefficient g1 is a coefficient converted a value of an arbitrary unit in the microcomputer into a modulation factor [%].

$$\begin{pmatrix} Va \\ Vb \end{pmatrix} = \begin{pmatrix} \sin(THS) & \cos(THS) \\ -\cos(THS) & \sin(THS) \end{pmatrix} \begin{pmatrix} Vpn \\ Vqn \end{pmatrix} \quad (5)$$

$$\begin{pmatrix} Vun \\ Vvn \\ Vwn \end{pmatrix} = g1 \begin{pmatrix} \cos(0) & \sin(0) \\ \cos(2\pi/3) & \sin(2\pi/3) \\ \cos(4\pi/3) & \sin(4\pi/3) \end{pmatrix} \begin{pmatrix} Va \\ Vb \end{pmatrix} \quad (6)$$

The pulse operation unit PWM1 calculates the pulse signals or gate signals P1_U, P1_V and P1_W for turning on and off n pieces of the semiconductor devices which configures the power converter 2041 in response to the pulse-width modulation of the received voltage commands Vun, Vvn and Vwn to then output to the converter 2041.

Figure 6:
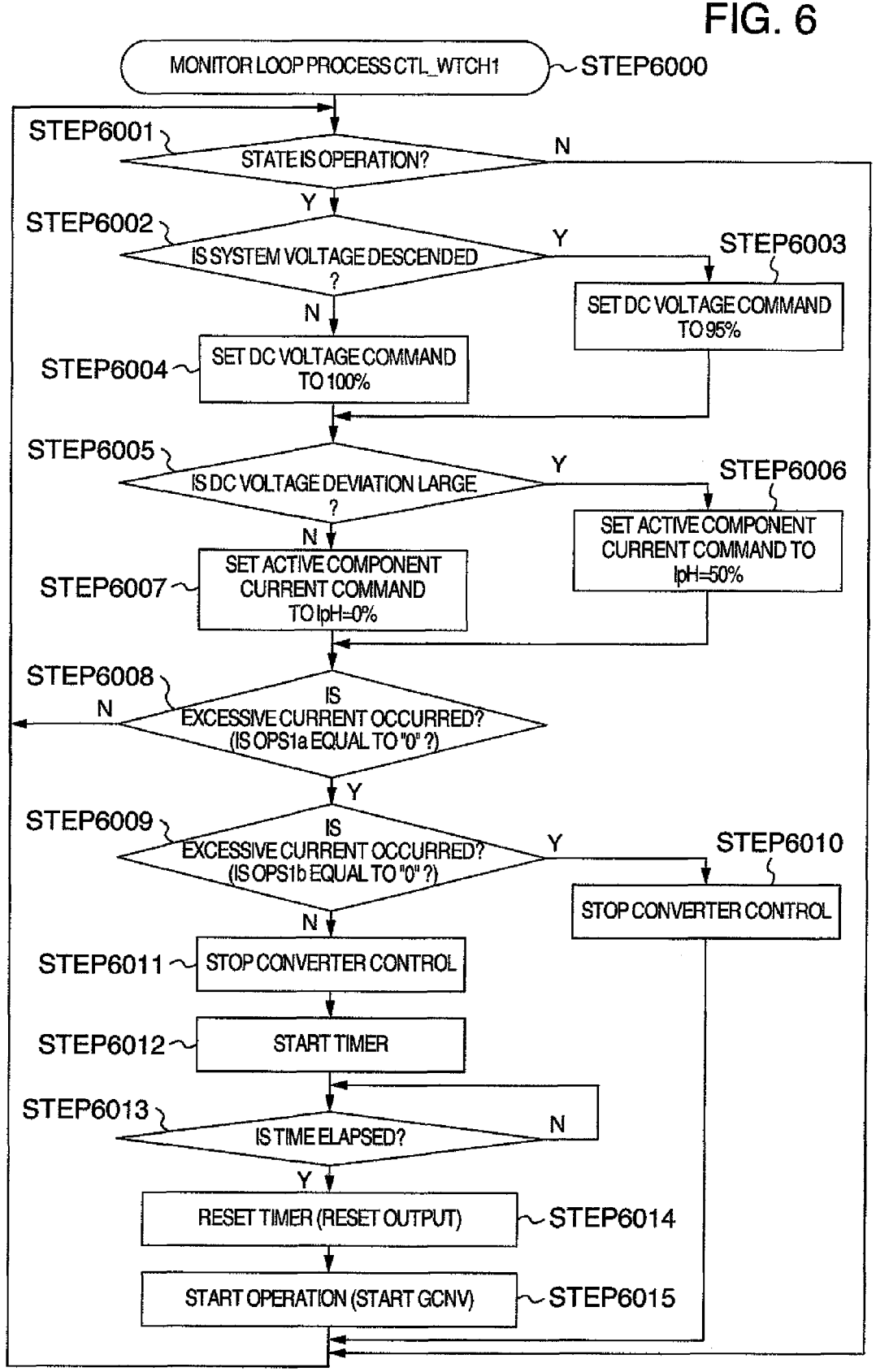
FIG. 6 is a flowchart of a monitor loop process CTL_WTCH1 in the system-sided converter 2041.

The monitor loop process CTL_WTCH1 (STEP6000) will be described with reference to FIG. 6. In STEP 6000, monitor loop monitors operation state because the system processes the monitor loop under operating state.

The system-sided converter 2041 descends the DC voltage command value by 5% at steps 6002 and 6003 when the system voltage descends. This is executed for preventing an occurrence of the DC excessive voltage from causing an energy from the generator-sided converter 2042. The system-sided converter 2041 keeps DC voltage 100% when the system voltage does not descend under predetermined value (for example 90%) The ascent of DC voltage can be made low if the capacitance of the DC regulated portion is made large, but the cost is increased. Therefore, an allowance range is given to the ascent of DC voltage by descending the DC voltage.

Further, when the DC voltage is ascended unnecessarily in the operation even though the DC voltage is intended to descend, the active amount current command value is changed directly for descending the DC voltage (here, −50% in this description as an example). In a normal operation, the active amount current command value is determined by the output of a DC voltage regulator DC-AVR, as described in FIG. 5. However, the DC voltage regulator has a time delay for its control in which the time delay occurs in the operation of descending the voltage. In consequence, a magnitude of a DC voltage deviation (difference between command value and detected value) is detected at a step 6005, and the active component current command value is changed to an electric discharge side at a step 6006. When the DC voltage deviation is smaller than predetermined value (for example 10% of command value), the active component current command correction signal IpH is set to 0 (STEP 6007).

Further, the excessive current might be occurred by causing the system-sided voltage variation, however, for a purpose of continuing the operation as long as possible, an excessive current protection level 1 smaller than an excessive current protection level 2 of the system-sided converter 2041 is given to the operation at steps 6008, 6009. When the detecting the excessive current protection level 1, the gate of the system-sided converter 2041 and its control are stopped temporarily, at a step 6011. As the gate is stopped, the switching of IGBT is stopped. Therefore, this simply becomes a rectifier to attenuate the excessive current. After occurring an excessive current level 1, the IGBT device might be damaged when detecting an excessive current level 2, therefore, the system-sided converter 2041 is stopped at a step 6010. When the excessive current level 2 is not present but the excessive current level 1 is only detected, the system-sided converter 2041 is stopped temporarily at the step 6011, timer is reset at STEP 6014) and operation is restarted at a step 6015 after elapsing a certain time period (for example about 1 ms after) at steps 6012, 6013.

In this way, the DC voltage is remained low when the system voltage is low, therefore, the system can be provided for such that the excessive voltage state of the DC voltage is hardly occurred.

Further, a unit for directly changing the active component current is provided for when the DC voltage becomes higher than the command value, in consequence, the operation can be realized to descend the DC voltage, which is faster than the DC voltage control. Therefore, the system can be provided for preventing the excessive voltage caused by a response delay of the DC voltage control and for hardly occurring the excessive voltage state.

The system-sided converter is stopped temporarily when detecting the excessive current, in consequence, a failure of the converter devices is prevented and the DC voltage ascent is also prevented by restating it immediately.

Next, a control of the converter 2042 will be described with reference to FIG. 7.

A rotation number signal ω indicating the number of rotation and a position of the generator 201 is entered into a rotation phase detector ROTDET. For example, an ABZ type encoder is used for detecting the rotation number signalω. The rotation phase detector ROTDET counts pulses A and B of the rotation number signal ω to convert into a phase signal, reset the phase signal to "0" by using the pulse (for example, Z-phase pulse in the ABZ type encoder) once one rotation, generate a phase signal RTH from "0" to "360" degrees, and then output the generated phase signal RTH to the adder 303.

The phase signal RTH and an output phase signal LTH of a synchronization controller SYNC are added by an adder 304 to be turned into a phase signal TH. The phase signal TH enters an excitation phase operation unit SLDET together with the phase signal THS (already described in the control of converter 2041).

The excitation phase operation unit SLDET applies a subtract to the phase signals TH and THS to further apply it to a polar logarithm multiplied by k (THR=k(THS−TH)) and output a slip phase signal THR of the generator rotor.

A power operation unit PQCAL transforms the system current ISY by using the same conversion matrix as the expression (1) to obtain an α-axis current Isα and a β-axis current Isβ, and receive an α-axis voltage detected value Vsα calculated by the expression (3) and a β-axis voltage detected value Vsβ. An active power Ps and a reactive power Qs of the system are then calculated by an expression (7).

$$Ps=3(Vs\alpha*Is\alpha+Vs\beta*Is\beta)/2$$

$$Qs=3(-Vs\alpha*Is\beta+Vs\beta*Is\alpha)/2$$

An active power regulator APR receives the active power Ps and the power command value Pref of the wind power generation system to output an active component current command value Ip0 in such that a deviation between the power command value Pref and the power detected value Ps is turned into zero. Here, the following description will be concerned with the example of active power command. However, in the case of a torque command, it is possible to control the torque such that the torque command is multiplied by the rotation number of the generator to transform to the active power command. The active power control is different from the torque control, and an output power can be controlled in constant without subjecting to an adverse effect of the rotation number even though it is varied.

Further, a reactive power regulator AQR receives the reactive power Qs and a power command value Qref of the wind power generation system to output an excitation current command value Iq0 in such that a deviation between the power command value Qref and the reactive power Qs is turned into zero. Here, the power regulators APR, AQR can be configured by the proportional-integral unit.

The current command values Ip0, Iq0 as outputs from the active/reactive power regulators enter a switch SW.

The generator stator current IST enters a three-phase rotation coordinate converter 3DQ03. The generator stator current IST is broken down into an active component current Ipst and a reactive component current Iqst by using the conversion equations of the expressions (1) and (2) to then enter generator current regulators ACRP, ACRQ.

The generator current regulator ACRP receives zero as a stator active current command value to calculate a rotor current command value Ip2 so as to turn the active component current Ipst of the generator stator current into zero and output the rotor current command value Ip2 to the switch SW. Further, the generator current regulator ACRQ receives a stator reactive current command value Iqstr to calculate a rotor current command value Iq2 so as to match the reactive component current Iqst of the generator stator current with the command value and then output the rotor current command value Iq2 to the switch SW. The stator reactive current command value Iqstr is given by a function of a system voltage descent amount, for example, which is set for supplying the reactive current to the system when the system voltage descends.

The following description will be concerned with a voltage regulator AVR. The voltage regulator AVR sets an amplitude value Vpk of the generator stator voltage VST to a feedback value to receive a value filtered for the amplitude value of the system voltage VSY or an average value as a command value Vref and output, to the switch SW, an excitation current command value Iq1 in such that a deviation between the amplitude value Vpk and the command value Vref is turned into zero. Here, the voltage regulator AVR is configured by the proportional-integral controller, for example. The voltage regulator AVR operates when the breaker 208 is an open-state to regulate the excitation current command value for flowing the current from the converter 2042 to the secondary of generator 201 so that the amplitude value of the generator stator voltage VST is matched with the amplitude value of the system voltage.

An output current IR of the converter 2042 also enters an excessive current detector OC3 and a three-phase rotating coordinate converter 3DQ04. The excessive current detector OC3 is configured by a comparator and a holding circuit to turn an excessive current detected signal OPS2a into "0" and hold it when detecting the excessive current. The excitation current detector OC3 receives a reset signal RESET3 from a monitor loop process CTL_WTCH2 to release the holding state "0" of the output thereof and turn the output into "1".

The excitation current detected signal. OPS2a is transmitted to both the monitor loop process CTL_WTCH2 and AND operation units. The monitor loop process CTL_WTCH2 generates an operation mode signal MD to be transmitted to the switch SW.

Further, a reverse-phase voltage component detector UBV receives the system voltage VSY to calculate a reverse-phase voltage magnitude VNEG from a difference between an effective value/maximum value and an effective value/minimum value derived from the respective phase voltage effective values of three-phase voltage, for example. The reverse-phase voltage magnitude VNEG and an amplitude value Vpk of the system voltage are transmitted to the monitor loop process CTL_WTCH2.

An excitation voltage detector OV1 of the DC voltage VDC is set so as to operate by a lower voltage than that for the excessive voltage detector OV2 as described with reference to FIG. 5. The detection level of excessive voltage detector OV2 is set to a level, in advance, which might not give the devices the damage even though the switching operation is performed by the converter 204.

Figure 8:
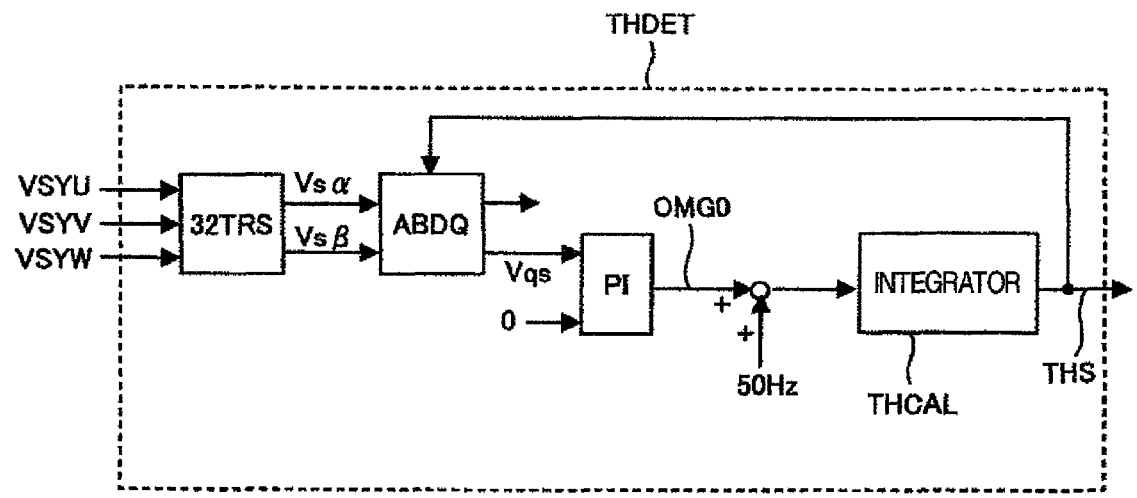
FIG. 8 is a diagram showing a configuration of a phase detector THDET.

Next, a phase detector THDET will be described with reference to FIG. 8. The phase detector THDET receives system voltages VSYU, VSYV and VSYW to calculate the expression (3) by a three-phase/two-phase converter 32TRS and convert into two-phase voltage signals Vsα, Vsβ. A rotation coordinate converter ABDQ receives the two-phase voltage signals Vsα, Vsβ to calculate the voltage detected values Vps, Vqs by the coordinate conversion equation indicated by the expression (4). The phase is corrected so as to turn the voltage detected value Vqs into zero by using the fact that the voltage detected value Vqs is turned into zero if the calculated phase THS is matched with the U-phase of the system voltage. For this reason, a frequency correction command OMG0 is generated in comparison with zero of the voltage detected value Vqs. The frequency correction command OMG0 enters an integrator THCAL to integrate and transform the frequency correction command OMG0 into the phase signal THS.

Figure 9:
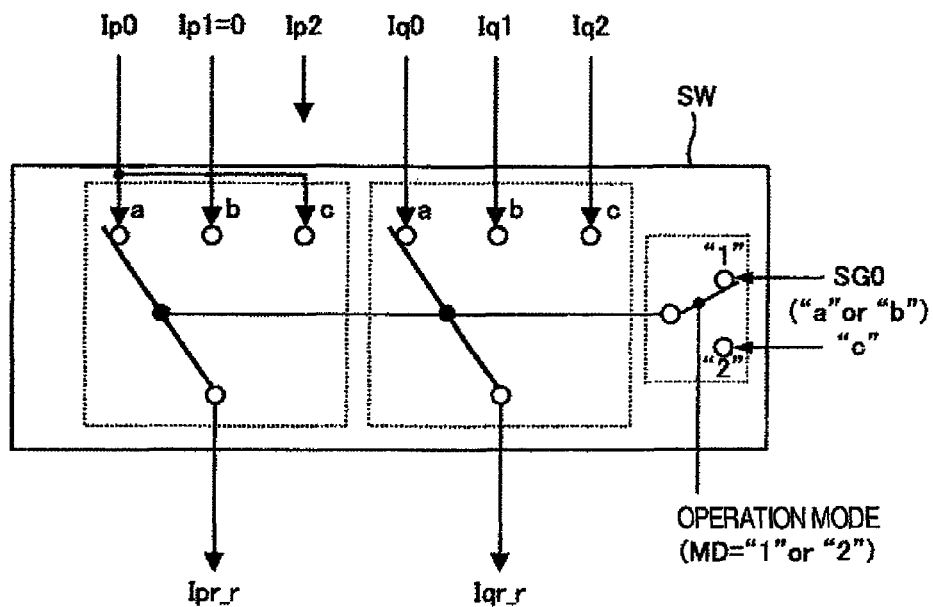
FIG. 9 is a diagram showing a configuration of a command switch SW.

FIG. 9 shows a configuration of the switch SW. The switch SW determines to output whether a normal generation operating mode (switch position "a") using the current command values Ip0, Iq0 of power regulators APR, AQR, or a system synchronization mode (switch position "b") using zero for the active component current command value and the excitation current command value Iq1 of the voltage regulator AVR for the excitation current command value, or a system failure operating mode (switch position "c") using the rotor current command values Ip2, Iq2 of the system stator current regulator ACRP, ACRQ for regulating the stator current of the generator.

Before the breaker 208 is actuated by the switch SW (that is, at a time of a voltage synchronizing operation synchronized the generator stator voltage with the system voltage, a start signal SG0 is "b"), the switch SW uses zero for the active component current command value and the excitation current command value Iq1 of the voltage regulator for the excitation current command value. After the breaker 208 is actuated (the start signal SG0 is "a"), the switch SW selects the current command values Ip0, Iq0 of the respective power regulators APR, AQR. On the normal generating operation, the operation mode signal MD indicates the normal operating state "1". The changeover of the command value is selected by causing the start signal Sg0, however, the rotor current command values Ip2, Iq2 of the stator current regulators ACRP, ACRQ are selected when the operation mode signal MD is turned into the state of "2" caused by detecting such a system failure.

Figure 7:
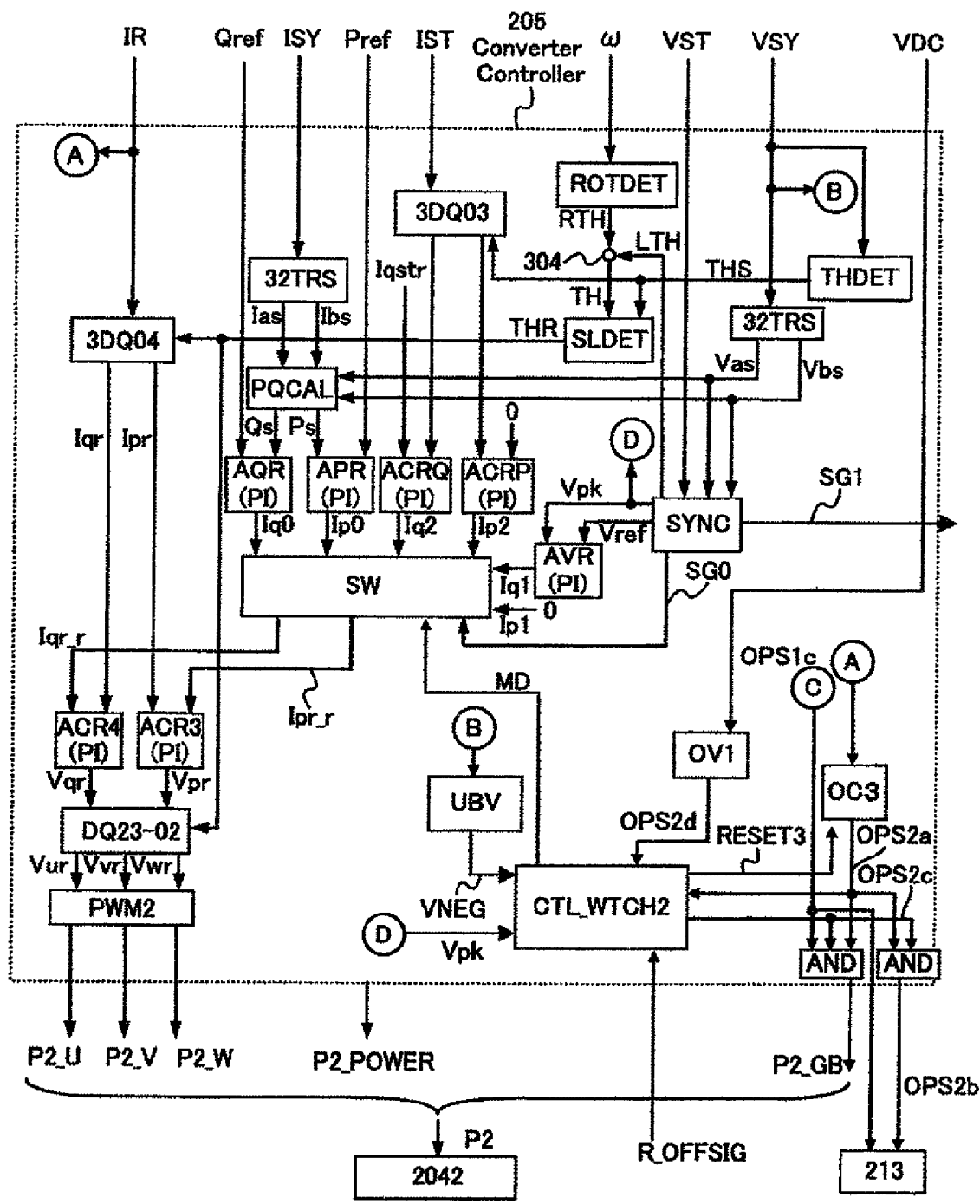
FIG. 7 is a diagram showing a control configuration of the generator-sided converter 2042.

The synchronization controller SYNC shown in FIG. 7 provides a function for determining whether the voltage amplitude of the generator is synchronized by using a system voltage detected value Vsref and a generator stator voltage detected value Vgpk when the breaker 208 is an open-state, a function for outputting the phase correction signal LTH to correct the phases of the system voltage and the stator voltage when they are different, and a function for determining whether the phases of the system voltage and the stator voltage are present in a predetermined range and synchronized with each other. The synchronization controller SYNC also outputs the start signal SG1 of the breaker and the start signal SG0. When the breaker 208 is a closed-state by the start signal SG1, the phase correction signal LTH maintains the value at the time of the closed-state.

According to the functions of the synchronization controller SYNC, the synchronization is made with the system voltage before the generator 201 is connected with the system. Further, after the generator 201 is connected with the system, the control can be changed over to the power control immediately.

The three-phase rotation coordinate converter 3DQ04 calculates a q-axis current detected value Iqr (excitation current component) and a p-axis current detected value Ipr (active current component) from the received current IR and the phase THR of the rotor by using conversion equations (8) and (9). The q-axis current detected value Iqr is output to a current regulator ACR4, and the p-axis current detected value Ipr is output to a current regulator ACR3. Here, a coefficient k3 is a coefficient converted into an arbitrary unit in the microcomputer.

$$\begin{pmatrix} Ir\alpha \\ Ir\beta \end{pmatrix} = k3 \begin{pmatrix} \cos(0) & \cos(2\pi/3) & \cos(4\pi/3) \\ \sin(0) & \sin(2\pi/3) & \sin(4\pi/3) \end{pmatrix} \begin{pmatrix} Iru \\ Irv \\ Irw \end{pmatrix} \quad (8)$$

$$\begin{pmatrix} Ipr \\ Iqr \end{pmatrix} = \begin{pmatrix} \sin(THR) & -\cos(THR) \\ \cos(THR) & \sin(THR) \end{pmatrix} \begin{pmatrix} Ir\alpha \\ Ir\beta \end{pmatrix} \quad (9)$$

The current regulator ACR4 regulates a q-axis voltage command value Vqr as an output so as to turn a deviation between one of either the q-axis current command value Iq1 or Iq0 or Iq2 and the q-axis current detected value Iqr into zero. Likewise, the current regulator ACR3 regulates a p-axis voltage command value Vpr as an output so as to turn a deviation between one of either the p-axis current command value Ip1 or Ip0 or Ip2 and the p-axis current detected value Ipr into zero. Here, the current regulator can be configured by the proportional-integral unit, for example.

The p-axis voltage command value Vpr and the q-axis voltage detected value Vqr enter a two-phase/three-phase coordinate converter DQ23-02. The two-phase/three-phase coordinate converter DQ23-02 calculates voltage command values Vur, Vvr and Vwr, output from itself, from the phase signal THR and the respective input values by using conversion equations (10) and (11) to then output to a pulse operation unit PWM2. Here, a coefficient g2 is a coefficient converted a value of an arbitrary unit in the microcomputer into the modulation factor [%].

$$\begin{pmatrix} Va \\ Vb \end{pmatrix} = \begin{pmatrix} \sin(THr) & \cos(THr) \\ -\cos(THr) & \sin(THr) \end{pmatrix} \begin{pmatrix} Vpr \\ Vqr \end{pmatrix} \quad (10)$$

$$\begin{pmatrix} Vur \\ Vvr \\ Vwr \end{pmatrix} = g2 \begin{pmatrix} \cos(0) & \sin(0) \\ \cos(2\pi/3) & \sin(2\pi/3) \\ \cos(4\pi/3) & \sin(4\pi/3) \end{pmatrix} \begin{pmatrix} Va \\ Vb \end{pmatrix} \quad (11)$$

The pulse operation unit PWM2 calculates gate signals P2_U, P2_V and P2_W which turn on and off the semiconductor devices configuring the converter 2042 in response to the received voltage command values Vur, Vvr and Vwr by using the pulse-duration modulation method to then output to the converter 2042.

Figure 10:
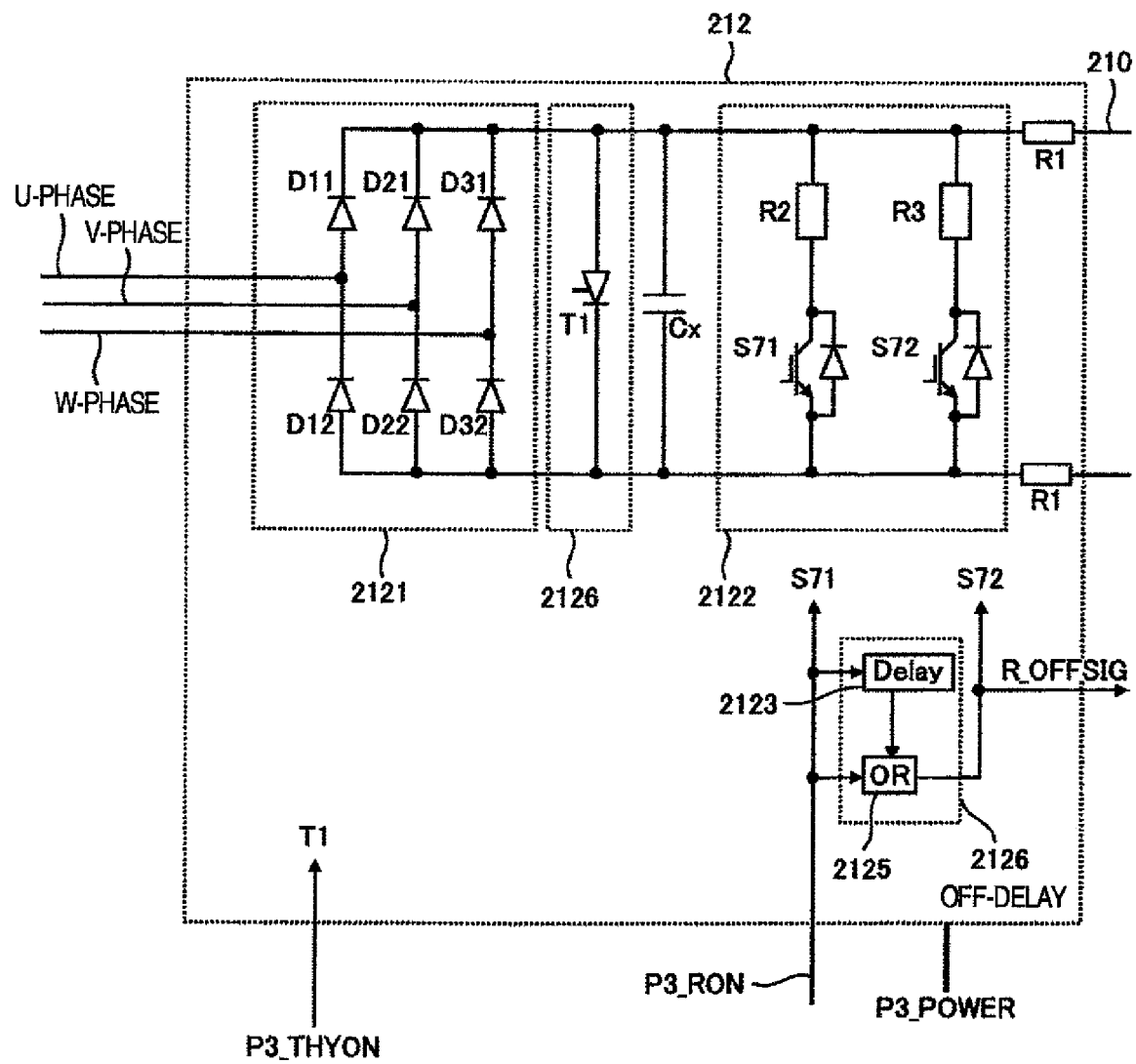
FIG. 10 is a diagram showing a circuit configuration of an excessive current consumption device 212.

FIG. 10 shows a circuit configuration of the excessive current consumption device 212. The excessive current consumption device 212 is configured mainly by a rectifier 2121, an energy consumption unit 2122 and a shunt switch unit 2126. An AC input of the rectifier 2121 is coupled to the secondary winding terminal of generator 201. Here, the rectifier 2121 is configured by diodes D11, D12, D21, D22, D31 and D32 shown in FIG. 10.

The rectifier 2121 has a capacitor Cx in its DC portion. The DC portion of rectifier 2121 has the energy consumption unit 2122 configured by a circuit where resistors R2, R3 are connected respectively to semiconductor switches S71, S72. A positive side and a negative side of the DC portion in the energy consumption unit 2122 are connected respectively to the converter 204 via resisters R1, R1.

The shunt switch unit 2126 uses a switch unit T1 (here, thyristor as semiconductor) for the shunt to be able to turn the switch unit T1 on in response to an on-command (P3_THYON) from the controller 213.

A gate signal P3_RON for turning the semiconductor switches S71, S72 on and off is given from the controller 213. The gate signal P3_RON is used for a signal for turning the semiconductor switch S71 on. The gate signal P3_RON also enters the shunt switch unit 2126 or an off-delay unit 2126, and further enters a delay unit 2123 and an OR operation unit 2125 to add a delay time period to the signal. The off-delay unit 2126 outputs a delay signal 3722 delayed from an input signal S711 by an off-delay time period TD2 during which an off-timing is delayed. Current is flowed through the resistor R3 when the signal S722 is an on-state. According to the configuration shown in FIG. 10, current is flowed through the resistors R2, R3 simultaneously, and when current is not flowed through them, the resistor R2 is first and the resistor R3 is next with a delay. Here, this embodiment indicates the two resistors R2 and R3, however, the three resistors or more may also configure the same configuration to be able to change, in stepwise, the resistor value to be shunted by changing an off-timing.

Further, an operation signal R_OFFSIG for finally turning the resistors to non-conduction is transmitted to the converter controller 205.

When the excessive current consumption device 212 is operated by the command from the controller 213, the converter 2042 becomes a gate-stopped state and operates as a diode rectifier. For example, the excessive current generates on the rotor of the generator to stop the gate of converter 2042 and further turn on the semiconductor switches S71, S72 resided in the DC portion in the excessive current consumption device 212. At this time, since an impedance of the excessive current consumption device 212 becomes low compared with the converter 2042 being operated as the diode rectifier, almost all the excessive current generated on the rotor is flown into the excessive current consumption device 212, so that the current amount flown into the converter 2042 can be made small and the semiconductor switching devices in the converter 2042 can be prevented from damaging by the excessive current. At this time, an energy flown into the DC portion of the excessive current consumption device 212 from the three-phase AC is consumed in the resistors R2 and R3. For a purpose of making the resistor size for consuming the energy small, it is practically desirable that the number of operation times of the excessive current consumption device 212 is set consecutively to as many as two to three times in response to a limitation.

Figure 11:
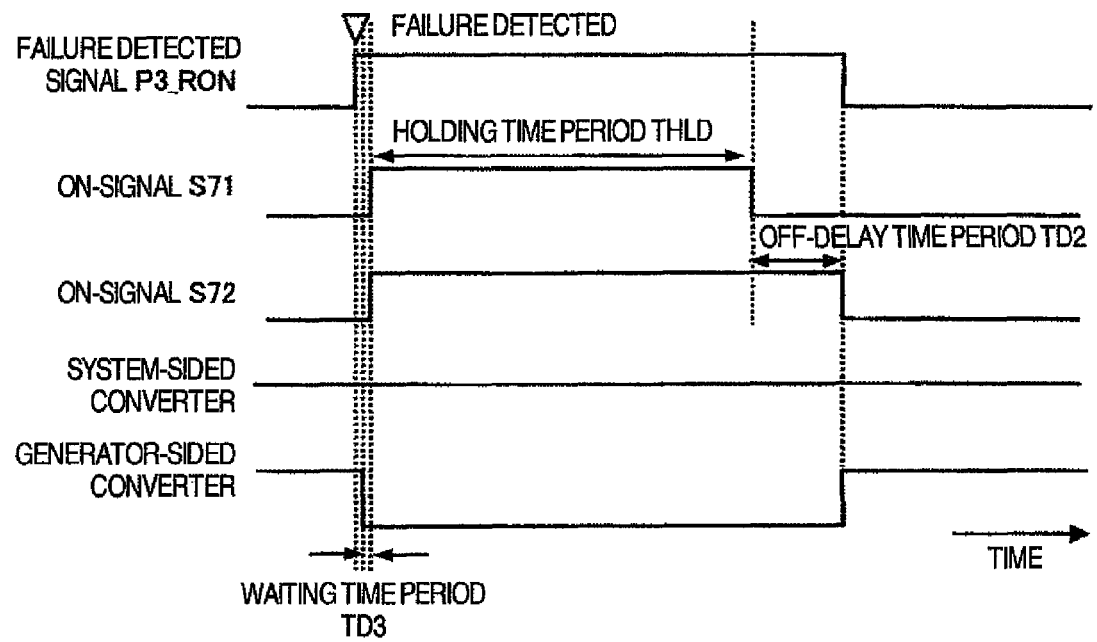
FIG. 11 is an operating time chart of the excessive current consumption device 212.

An operation in FIG. 10 will be described with reference to FIG. 11. A system failure is detected to turn the gate signal or detected signal P3_RON to "1" from "0". According to the configuration in FIG. 10, the signals S711, S722 turn on simultaneously, and when they become an off-state, the signal S711 turns off first and the signal S722 then turns off with a delay by an off-delay time period TD2. For this reason, current is flowed through the resistors R2, R3 simultaneously, and remain conducted for a holding time period THLD. Thereafter, the resistor R2 is cut off, and the resistor R3 then become cut off after the off-delay time period TD2.

It is desirable that the value of resistors R1 are set to such that a time constant TCR (R1[Ω]×Cd[F]) becomes more than the holding time period THLD when configuring the DC circuit together with the capacitor Cd of the DC portion in the converter 204. For example, when the holding time period THLD is 100 ms, the time constant TCR may be equal to or greater than 100 ms. According to the above-mentioned setting, a DC voltage descent amount of the converter 204 can be made small when the semiconductor switches S71, S72 are turned on.

Figure 12:
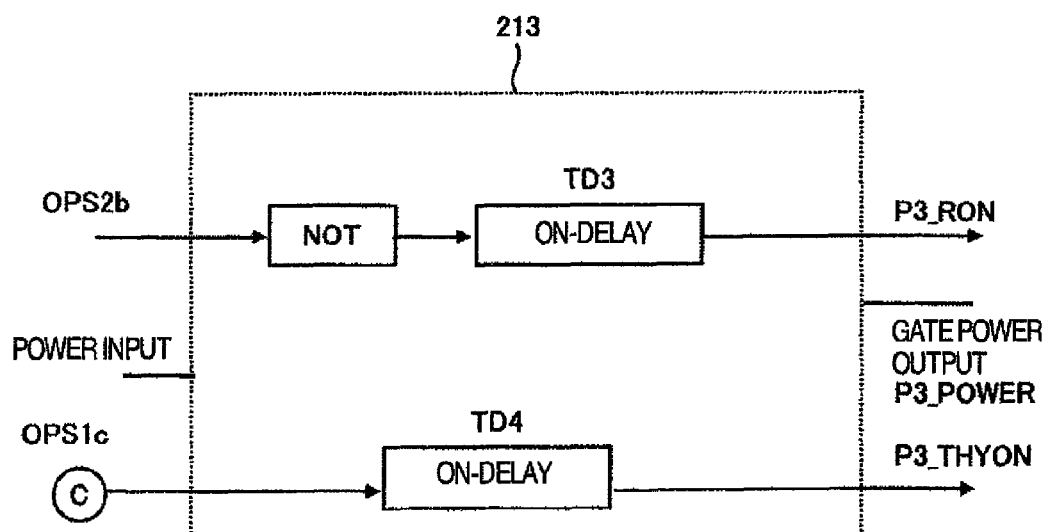
FIG. 12 is a diagram showing a control configuration of a controller 213 of the excessive current consumption device 212.

The following description will be concerned with a configuration of the controller 213 for the excessive current consumption device 212 with reference to FIG. 12.

The controller 213 receives a signal OPS2b to then output a signal for conducting the resistor to the excessive current consumption device 212 after elapsing an on-delay setting time period or waiting time period TD3. The controller 213 also receives a signal OPS1c to then output a signal P3_THYON for turning a thyristor T1 on to the excessive current consumption device 212 after elapsing an on-delay setting time period TD4.

The on-delay setting time periods TD3, TD4 can surely prevent the resistors from conducting on the operation of converter 2042.

Figure 13A:
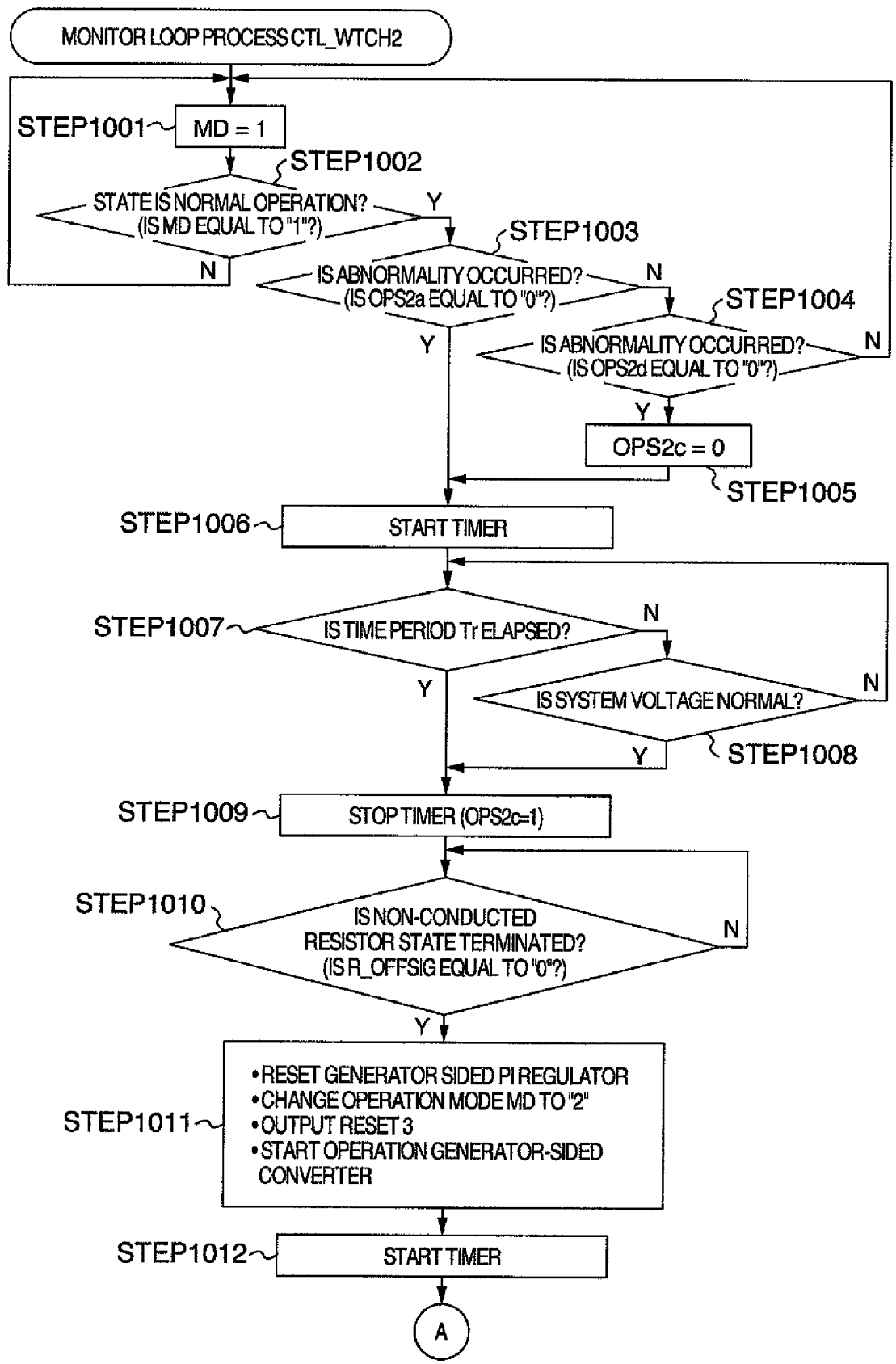
FIGS. 13A and 13B are flowchart of a monitor loop process CTL_WTCH2 in the generator-side converter 2042.
Figure 13B:
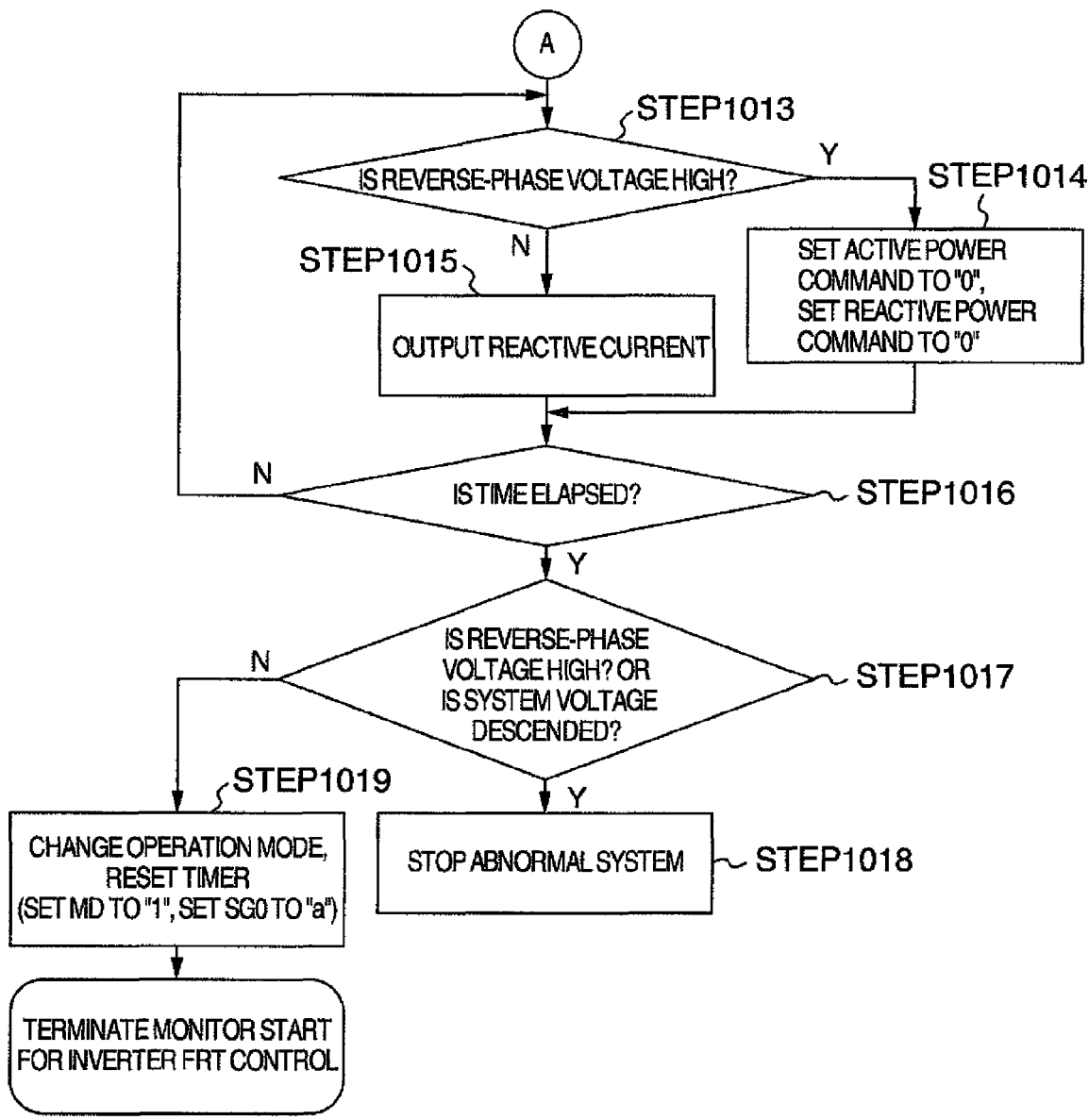

The following description will be concerned with an operation of the monitor loop process CTL_WTCH2 for the generator-sided converter 2042 with reference to a flowchart in FIGS. 13A and 13B.

When the operation state is normal (MD is "1"), the operation mode MD is monitored at steps 1001, 1002, and the ascent of DC voltage VDC (excessive voltage signal OPS2d) and the excessive current (excessive current signal OPS2a is "0") of the generator-sided converter 2042 are also monitored at a step 1003.

When a rotor excessive current is detected (OPS2a is "0") at the step 1003, the operation signal OPS2b of the excessive current consumption device 212 is turned into "0" to conduct the resistors in the excessive current consumption device 212. Further, when the DC excessive voltage is detected (OPS2d is "0") at a step 1004, the operation signal OPS2c is turned into "0" at a step 1005, therefore, the operation signal OPS2b of the excessive current consumption device 212 is turned into "0" to conduct the resistors in the excessive current consumption device 212. (The generator-sided converter 2042 whether detects the rotor excessive current (OPS2a is "0") or becomes the stop-state when detecting the operation signal (OPS2b is "0") of the excessive current consumption device 212, as described with FIG. 7, and the resistors in the excessive current consumption device 212 are turned on by the operation signal (OPS2b is "0").)

The above-mentioned excessive current or excessive voltage is detected, a timer starts at a timing at which the resistors R2, R3 in the excessive current consumption device 212 are conducted, and the resistors are conducted for a predetermined time period Tr, at steps 1006, 1007, 1008 and 1009.

For example, the system voltage is monitored for 150 ms as the predetermined time period Tr whether it is recovered to a normal value. When the system voltage is recovered to 100%±10% of the normal value in range of the predetermined time period Tr, the timer is reset and the resistors proceed to a non-conduction state in series at the step 1009. Therefore, when the system voltage is recovered to the normal value, the resistors are set to the non-conduction state without awaiting a termination of the predetermined time period Tr. The resistors become the non-conduction after the termination of predetermined time period Tr when the system voltage is not recovered to the normal value.

Thereafter, the non-conduction state of the resistors is made sure by a signal R_OFFSIG at step 1010. The control (proportional-integral unit) of the generator-sided converter 2042 as described in FIG. 7 is then reset, the operation mode MD is turned into "2", and the excessive current detector OC3 is reset to then restart the generator-sided converter 2042. At this time, the timer starts so that the time period, during which the operation mode MD is "2", is measured at a step 1012.

When the operation mode MD is "2", the generator-sided converter 2042 becomes an operation-state for controlling the active power of the generator and the reactive current component of the rotor current, as described in FIG. 7.

When the operation mode MD is "2", the active power command value Pref and reactive current command value Iq2 are set to zero when the reverse-phase component of the voltage is large, at steps 1013, 1014.

If the reverse-phase voltage is lower than a predetermined value, the reactive current is output for a predetermined time period as specified in Grid Code of E.ON. When the reverse-phase voltage of the system is high, a pulsating voltage caused by the reverse-phase component is largely appeared on the secondary terminal of the AC excitation generator. For this reason, the excessive current might be appeared again if attempting to increase the current, therefore, the power on the stator side should be set to a zero-state when the reverse-phase voltage is high. When the reverse-phase voltage is low, the pulsating voltage caused by the reverse-phase voltage on the rotor side is also low. Therefore, the operation can be continued without appearing the excessive current, even though the reactive current is output from the generator stator.

After elapsing a predetermined time period (for example, a time period determined by the specification of power system) under a condition where the state of the operation mode MD is "2" and the reverse-phase voltage is high at that time and the system voltage is low, the system is stopped since the system is abnormal, at steps 1017, 1018. When the system abnormal is not detected at the step 1017, the operation is recovered to normal since the operation mode MD is "1" or normal, and the start signal SG0 is "a".

In this way, the gate of the converter 2042 is made stopped before the excessive current consumption device 212 is operated, so that the rotor current alone can be shunted to the excessive current consumption device 212.

Further, the operation of the converter 2042 is restarted after completing the non-conduction of resistors, so that the operation can be restarted without flowing the current output from the converter 2042 into the excessive current consumption device 212.

Before the voltage of the DC portion in the converter 204 is ascended to a level (a detected level of the excessive voltage detector OV2 in FIG. 5) at which the converter is damaged by the switching, the excessive current consumption device 212 is operated by the ascent of DC voltage (a lower excessive voltage level than a stop level shown the excessive voltage detector OV1 in FIG. 7) at the step 1004, so that an operation continuing range of the system can be expanded.

The detecting unit for the DC voltage ascent may use a deviation between the command value of DC voltage controller DCAVR and a feedback value.

Further, when the power command value Pref shown in FIG. 7 is varied rapidly and largely, a unit for preventing the rapidly-varying, such as a variation limiter for the power command value Pref, may be provided since the DC voltage VDC is varied largely.

Figure 14A:
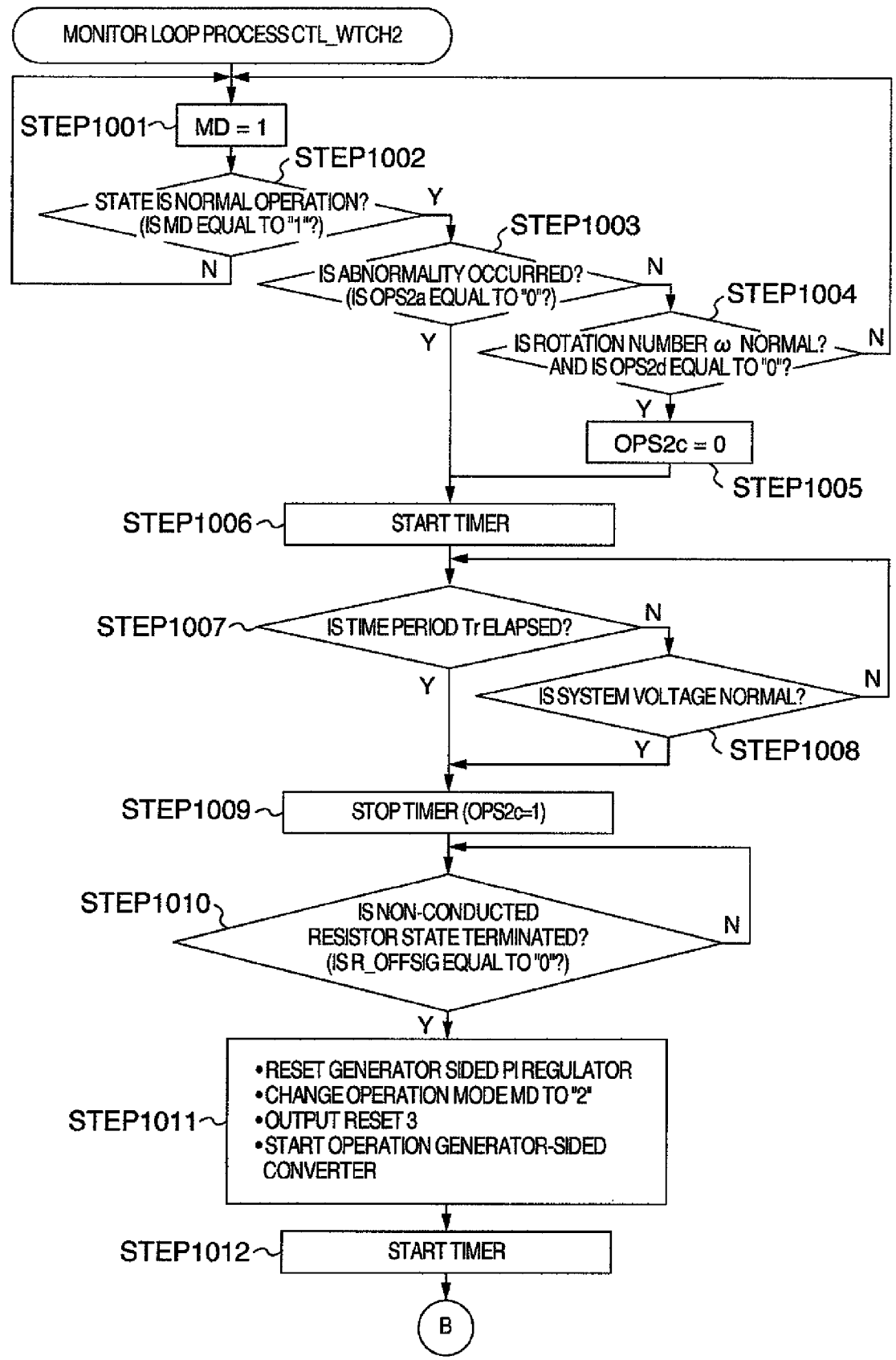
FIGS. 14A and 14B are flowchart of a monitor loop process CTL_WTCH2 in the generator-sided converter 2042.
Figure 14B:
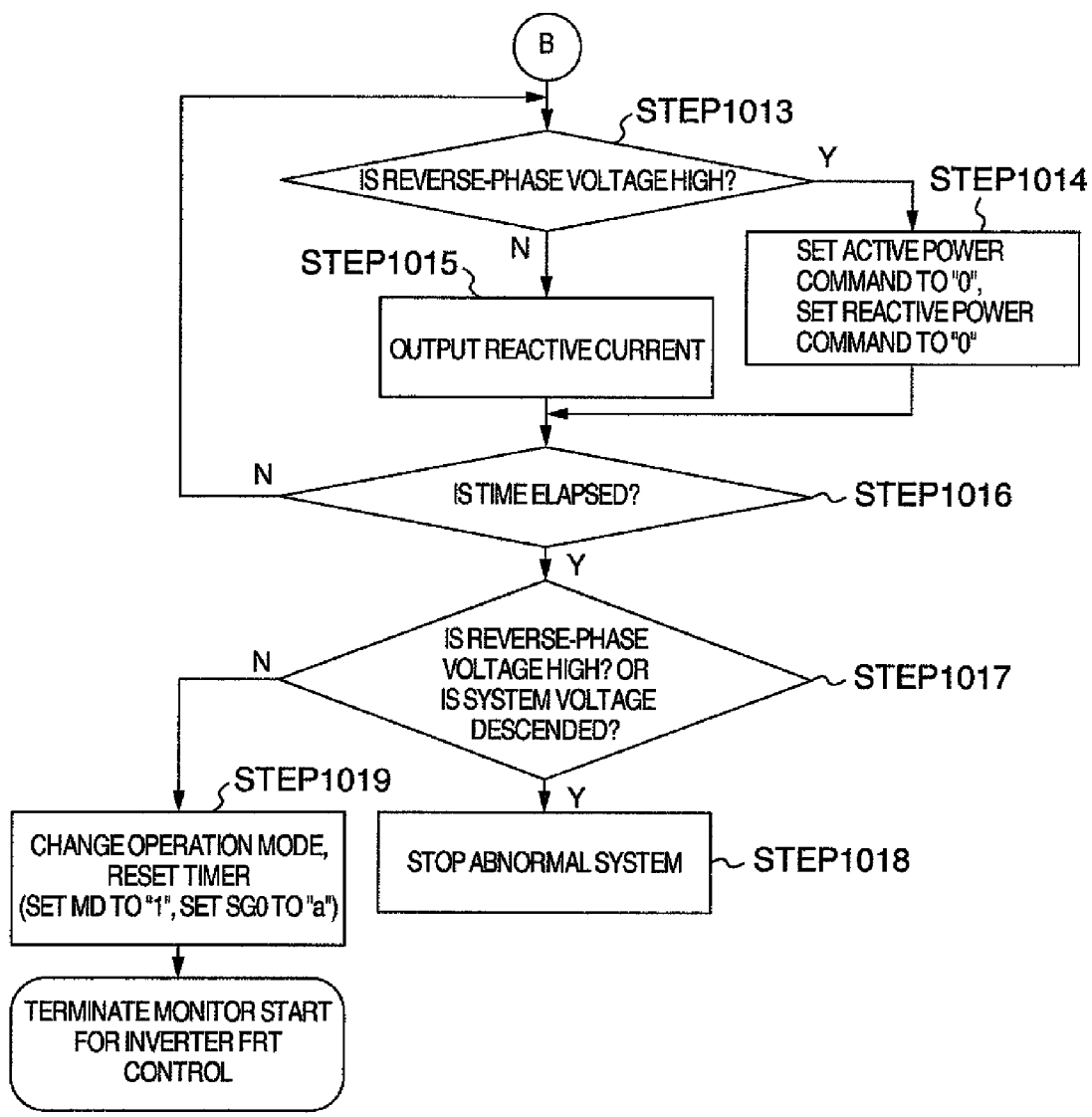

In the case where the converter control cannot follow at an excessive rotation, a lower limit of the speed, etc., a condition may be set so as to only operate the step 1004 in FIG. 13 or the number of rotations in the normal range in the system predictable of the excessive rotation and the descent of speed, since the DC current VDC might be varied, at the step 1004 in FIG. 14A. Other steps in FIGS. 14A and 14B are the same as those in FIG. 13, therefore, description for those is omitted.

As described above, the non-conduction start time of the resistors is made hastened by recovering the system voltage, in consequence, the time period is made short for connecting the resistors to the rotor to thereby remove a redundant time of connecting the resistors. Therefore, the time can be made short for recovering the operation to the normal.

In this way, the generation power and reactive power are controlled to set to zero when the reverse-phase voltage is high, so that the rotor excessive current can be prevented from causing the reverse-phase component of the system voltage.

The invention can be applied not only to the wind power generation system but also to the excitation power converter of a secondary excitation type generator and a generation device.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wind power generation system that supplies a generated power to a power system from an AC excitation generator, comprising:
    a stator of the AC excitation generator connected with the power system;
    an AC excitation converter connected with a rotor of the AC excitation generator, the rotor of the AC excitation generator connected with a turbine to rotate the rotor of the AC excitation generator by a motive energy of the turbine;
    a shunt circuit unit, shuntable by a switching unit, provided between the AC excitation converter and the rotor of the AC excitation generator;
    a system-sided converter connected between the stator of the AC excitation generator and the power system, a DC portion of the system-sided converter connected with a DC portion of the AC excitation converter; and
    a converter controller provided for controlling an excitation converter and the system-sided converter backed up at when a system voltage is descended, wherein
    the converter controller includes a unit that detects a DC voltage, a DC voltage ascent detection unit and a unit that operates the shunt circuit unit when the DC voltage ascent detection unit detects the DC voltage ascent.

2. The system according to claim 1 wherein the converter controller includes a unit that detects a current between the generator and the AC excitation converter as an excessive current, and the shunt circuit unit is operated by a signal from either the unit that detects the excessive current or the DC voltage ascent detection unit.

3. The system according to claim 1 wherein the DC voltage ascent detection unit detects a larger voltage value than that in a normal operation.

4. The system according to claim 1 wherein the DC voltage ascent detection unit detects the DC voltage ascent by an excessive voltage detection level set between a voltage level at a normal operation and an excessive voltage level for protection of the excitation converter and the system-sided converter.

5. The system according to claim 1 wherein the DC voltage ascent detection unit detects that a deviation between a DC voltage command value and a detected value is large.

6. The system according to claim 1 further comprising a unit that stops a gate of the AC excitation converter when an excessive current occurs between the generator and the excitation converter.

7. The system according to claim 1 wherein the shunt circuit unit includes a plurality of resistors, and a unit that operates substantially and simultaneously the resistors on a shunt and makes the resistors non-conductive in series on a release from the shunt.

8. The system according to claim 1 wherein the shunt circuit unit includes a plurality of resistors, a unit that operates substantially and simultaneously the resistors on a shunt and makes the resistors non-conductive in series on a release from the shunt, and a unit that makes a period, during which the resistors operate simultaneously, variable in response to an amplitude value of a system voltage.

9. The system according to claim 1 wherein shunted resistors are turned to non-conduction by the shunt circuit unit to then start an operation of the AC excitation converter, after starting the operation, an active power and a reactive power of the stator of the AC excitation generator are controlled to substantially zero when a negative sequence component is largely present in a voltage of the power system.

10. The system according to claim 1 wherein the shunt circuit unit applies an operation to the resistors such that a cycle from a simultaneous conduction of the resistors to a non-conduction of those in series is performed continuously by twice, and the wind power generation system is stopped when the cycle is turned to three times.

11. The system according to claim 1 further comprising a unit that prevents a rapidly varied command value of a generated power controlled by the converter.

12. The system according to claim 1 further comprising a unit that detects a system voltage descent, and a unit that descends the DC voltage of the system-sided converter when descending the system voltage.

13. The system according to claim 1 further comprising a unit that changes an active component current to a discharge when ascending the DC voltage of the system-sided converter.

14. The system according to claim 1 further comprising a unit that detects an excessive current of an AC current output from the system-sided converter, a unit that temporarily stops the system-sided converter when the excessive current detection unit detects the excessive current, and a unit that restarts the converter.

* * * * *